3,035,105
PROCESS FOR POLYMERIZING ETHYLENE TO C₄–C₁₀ TERMINAL OLEFINS

William D. Hoffman, Park Forest, Ill., assignor, by mesne assignments, to Sinclair Research, Inc., New York, N.Y., a corporation of Delaware
No Drawing. Filed Feb. 12, 1960, Ser. No. 8,251
3 Claims. (Cl. 260—683.15)

This invention relates to the polymerization of ethylene to yield olefins with a high percentage of straight-chain terminal mono-olefins.

Polymerization processes utilizing $AlR_3$ catalysts are well known, having been explored by Ziegler and his associates (see, for example, German Patent 878,560 and U.S. Patent No. 2,781,410). Ziegler discloses that trialkyl aluminum reacts with ethylene in a so-called "growth" reaction step to produce tri-n-alkyl aluminum compounds with chain lengths determined primarily by the amount of ethylene absorbed. For example, the growth reaction of trialkyl aluminum and ethylene takes place according to the following formula:

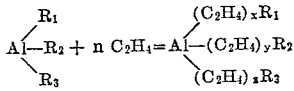

wherein $R_1$, $R_2$ and $R_3$ are similar or dissimilar lower alkyl radicals, preferably of 2 to 4 carbon atoms, and $x+y+z=n$. Usually, $n$ is about 12 to 30.

This reaction is then followed in a separate step by a "displacement" reaction in the presence of additional ethylene, which is catalyzed by a metal, such as nickel, whereby the alkyl residues, $-(C_2H_4)_xR_1$ $-(C_2H_4)_yR_2$ and $-(C_2H_4)_zR_3$ in the above formula are displaced by ethylene to produce olefins and trialkyl aluminum. Since the length of the alkyl group in the "growth" reaction is a function of the mole ratio of ethylene added to the amount of aluminum alkyl present, the result is that the amounts of the various olefins produced after the "displacement reaction" follow a normal Poisson distribution. (See G. Natta, C. Pine and M. Farina, International Union of Pure and Applied Chemistry, International Symposium on Macromolecular Chemistry, September 26—October 2, 1954, pp. 120–133.) It is also reported by Ziegler that in the presence of finely divided nickel the "growth" and "displacement" reactions occur concurrently but the resulting products contain appreciable amounts of isomerized material. Ziegler also found that the addition of acetylenic compounds to the combination of trialkyl aluminum, nickel and excess ethylene will cause concurrent growth and displacement with the majority of the olefin formed being butene—1.

It has now been discovered that high percentages of straight-chain terminal olefins which do not follow the normal Poisson distribution but instead are mainly $C_4$, $C_6$, $C_8$ and $C_{10}$ olefins, can be produced by conducting the growth and displacement reactions simultaneously in the presence of a diphenyl ether. Analyses of the olefins produced in accordance with the present invention indicate, moreover, that the predominate isomer is the normal terminal olefin with the remainder being mostly branched terminal olefins, and that only small amounts of double bond migration occur.

In accordance with the present invention a compound having the basic formula Al $R_1R_2R_3$ (wherein $R_1R_2$ and $R_3$ can be similar or dissimilar lower alkyls, say of 2 to 8 carbon atoms, as noted above) is reacted with about 6 to 30 moles of ethylene in the presence of a catalytic amount, for instance, as small as about .001 or less mole percent, preferably about .01 mole percent to about 0.1 mole percent based on the aluminum alkyl of finely divided nickel and about 0.5 to 2 or more moles, preferably about 0.8 to 1.25 moles, of a diphenyl ether per mole of trialkyl aluminum, at an elevated temperature of about 100 to 200° C., preferably about 110 to 135° C. The reaction pressure is usually superatmospheric such as about 50–5000 p.s.i.g., preferably about 400 to 2000 p.s.i.g., and the product comprises a mixture of terminal olefins mainly $C_4$, $C_6$, $C_8$ and $C_{10}$, and trialkyl aluminum. The olefins may be recovered from the liquid reaction mixture by distillation from the trialkyl aluminum-ether complex or the liquid product mixture can be hydrolyzed as, for example, with absolute ethanol to remove the trialkyl aluminum-ether complex. Amounts of the ether larger than about 1.5 moles per mole of trialkyl aluminum have been found unnecessary.

The ether used in the present invention is a diphenyl ether which can be a diphenyl ether substituted as with chlorine, bromine, lower alkyl, etc. or a material such as diphenylene oxide. An interesting feature is that unlike other ethers, this type of ether does not materially affect the growth reaction. Therefore, it is possible to use these ethers at moderately low temperatures as opposed to ethyl ether, for instance, which inhibits reactions at low temperatures. It is believed that although diphenyl ethers do form complexes with triethyl aluminum at room temperature, at temperatures of about 100–120° C. these complexes are largely disassociated.

In conducting the present invention, it is preferred to employ the nickel catalyst in a colloidal state. The nickel catalyst can be prepared in a colloidal state by mixing a nickel salt with trialkyl aluminum. The aluminum trialkyls reduce the nickel to colloidal nickel. Suitable salts, for instance, are nickel chelates such as nickel acetylacetonate.

The following examples will serve to illustrate the invention. The general procedure followed is described in the first example. Table I contains a summary of other experiments conducted according to the general procedure of Example I.

EXAMPLE I

A 500 ml. Magne Dash autoclave was carefully cleaned and polished until any residual traces of colloidal metal had been removed. This autoclave was then equipped with a system for introducing pure nitrogen and pure ethylene. The autoclave was flushed with prepurified nitrogen and pressure tested. The autoclave was then charged with 62 grams (0.37 mole) of diphenyl ether and 34 grams (0.25 mole) of triethylaluminum. An increase in temperature was noted upon the mixing of these two reagents. To this mixture was added 0.066 gram of nickel acetonyl acetone (0.00025) mole. The autoclave was then heated to 115° C. flushed with ethylene and then pressured up to 500 p.s.i.g. with ethylene. The reaction temperature was increased to 128° C. and maintained there for the duration of the experiment.

The amount of ethylene introduced was calculated by measuring the pressure drop of a reservoir which had been calibrated previously. The rate of reaction was found to be constant during the experiment with an ethylene uptake rate of 3.7 moles per mole of aluminum alkyl per hour. When approximately 7 moles of ethylene had been introduced, the reactor was chilled with Dry Ice until the temperature was reduced to less than 100° C. At this temperature, the reaction was very slow and the experiment was thus effectively stopped.

After the reaction mixture had cooled to room temperature, excess ethylene was released through Dry Ice traps until the pressure was constant at 25 p.s.i.g. The contents of the autoclave were then drained into a flask which had previously been flushed with nitrogen.

The liquid products were hydrolyzed with absolute ethanol in order to remove the aluminum alkyl. The gaseous products collected in the traps during the depressuring operations and the hydrolysis of reaction products were submitted for vapor phase chromatography analysis. The liquid product from the hydrolysis was washed with dilute hydrochloric acid to remove the aluminum and then dried. The molecular weight distribution was determined by gas chromatography with a method that had been established with known samples and checked against a micro distillation.

The purity of the olefins were determined by gas chromatography for the $C_4$ and $C_6$ olefins and by infrared analysis for the higher molecular weight olefins.

The overall olefin content was determined by fluorescent indicator absorption ASTM D13-19 and checked against the infrared analysis. The data obtained in this way are summarized in Table I.

*Table I*

| Run | 1084-18 | 1084-21 | 983-97 | 1084-5 |
|---|---|---|---|---|
| Reactants [a] | TEA, $C_2^=$, DPE | TEA, $C_2^=$ | TEA, $C_2^=$, DPE | TEA, $C_2^=$, DPE |
| Catalyst | Ni | Ni | Ni | Ni |
| Conditions: | | | | |
| Temperature, °C | 128 | 128 | 150 | 136 |
| Pressure, p.s.i.g | 500 | 500 | 500 | 500 |
| Final Mole Ratio, $C_2^=$/TEA | 24 | 21 | 15 | 25 |
| Mole Ratio Ether/TEA | 1.25 | | 1.40 | 1.5 |
| Olefin Distribution, Wt. Percent: | | | | |
| $C_4^=$ | 35.0 | 22.0 | | 24.0 |
| $C_6^=$ | 31.1 | 24.2 | 50 | 33.3 |
| $C_8^=$ | 21.1 | 19.7 | 25 | 25.9 |
| $C_{10}^=$ | 9.7 | 22.0 | | 11.9 |
| $C_{12}^=$ | 3.2 | 12.1 | | 4.9 |
| Olefin Purity: | | | | |
| Percent Vinyl | 58.5 | 72.5 | 49 | 66.0 |
| Percent Trans Int | 7.8 | 10 | 7.0 | 4.0 |
| Percent Vinylidene | 33.8 | 17.6 | 44 | 30.0 |
| Total Percent Olefin (excluding solvent or ether) in liquid products | 78 | 61 | 79 | 83 |
| Mole Percent Ni | .025 | .025 | ~0.001 | ~0.001 |
| Rate $C_2^=$ uptake per mole TEA/hr | 3.7 | 3.7 | 7.0 | 4.0 |

[a] Diphenylether, DPE; Ethylene, $C_2^=$; triethylaluminum, TEA.

The effect of diphenyl ether can be illustrated by runs 1084-18 and 21. In the first place, the rate of reaction is apparently unaltered. The major differences which occurred are believed largely due to the interaction of nickel and diphenyl ether. As can be seen, the amount of olefins and the sharpness of the molecular weight control increases in the presence of diphenyl ether.

This increase in the amount of olefins and the sharpness of molecular weight control is believed to be due to stabilization of the metal catalyst by diphenyl ether. Also, there is less double bond migration as shown by the percent of trans-internal olefins formed. Another example of catalyst stabilization can be seen in amount of vinylidene formation. Since vinylidene formation is also catalyzed by nickel, the long life of nickel results in a larger amount of dimer formation.

The olefins produced by this present invention are useful intermediates for the production of crystalline poly α-olefin, homopolymers and copolymers, detergents, terminal epoxides, fatty acids and in general straight-chain aliphatic products with a terminal functional group.

I claim:

1. A process for the polymerization of ethylene into mainly $C_4$ to $C_{10}$ polymers which comprises reacting at a temperature of about 100 to 200° C. and a superatmospheric pressure, a trialkylaluminum whose alkyl groups each contain 2 to 8 carbon atoms with about 12 to 30 moles of ethylene in the presence of a catalytic amount of nickel and about .5 to 2.0 moles of diphenyl ether per mole of said trialkylaluminum.

2. The process of claim 1 wherein the trialkylaluminum is triethylaluminum.

3. A process for the polymerization of ethylene into mainly $C_4$ to $C_{10}$ polymers which comprises reacting at a temperature of about 110 to 135° C. and a pressure of about 400 to 2000 p.s.i.g., triethylaluminum and about 12 to 30 moles of ethylene in the presence of about 0.01 to 0.1 mole percent of nickel and about 0.8 to 1.25 moles of diphenyl ether per mole of triethylaluminum.

References Cited in the file of this patent

UNITED STATES PATENTS 2,699,457    Ziegler et al.    Jan. 11, 1955
2,781,410    Ziegler et al.    Feb. 12, 1957